United States Patent
Kopp et al.

(12)
(10) Patent No.: US 6,396,859 B1
(45) Date of Patent: May 28, 2002

(54) CHIRAL TWIST LASER AND FILTER APPARATUS AND METHOD

(75) Inventors: Victor Il'ich Kopp, Flushing; Azriel Zelig Genack, New York, both of NY (US)

(73) Assignee: Chiral Photonics, Inc., Clifton, NJ (US)

( * ) Notice: Subject to any disclaimer, the term of this patent is extended or adjusted under 35 U.S.C. 154(b) by 0 days.

(21) Appl. No.: 09/498,521

(22) Filed: Feb. 4, 2000

Related U.S. Application Data (60) Provisional application No. 60/118,694, filed on Feb. 4, 1999, and provisional application No. 60/118,693, filed on Feb. 4, 1999.

(51) Int. Cl.⁷ .............................................. H01S 3/14
(52) U.S. Cl. .............................. 372/39; 372/43; 372/54; 372/98
(58) Field of Search .............................. 372/39, 98, 43, 372/54

(56) References Cited

U.S. PATENT DOCUMENTS

2001/0036212 A1 * 11/2001 Kopp et al. .................... 372/43

\* cited by examiner

*Primary Examiner*—Leon Scott, Jr.
(74) *Attorney, Agent, or Firm*—Edward Etkin, Esq (57) ABSTRACT

A defect causing a localized state is induced in a chiral structure composed of multiple chiral elements by twisting one element of the chiral structure with respect to the other elements along a common longitudinal axis such that directors of the element molecular layers that are in contact with one another are disposed at a particular "twist" angle therebetween, the twist angle being greater than a shift angle between directors of consecutive layers. The chiral twist structure may be utilized in a variety of applications such as filters, lasers and detectors. The defect caused by the twist may be made tunable by providing a tuning device for ly rotating one or more of the chiral elements with respect to one another to vary the twist angle and thus vary the position of the induced defect within a photonic stop band. Tunable defects may be advantageously utilized to construct wavelength tunable chiral filters, detectors and lasers.

60 Claims, 5 Drawing Sheets

CHIRAL TWIST LASER AND FILTER APPARATUS AND METHOD

RELATED APPLICATIONS

This application claims priority from U.S. Provisional Patent Application Serial No. 60/118,694 entitled "Chiral Twist Localization Laser and Detector" which was filed on Feb. 4, 1999 and from U.S. Provisional Patent Application Serial No. 60/118,693 entitled "Vertical Cavity Liquid Crystal Laser" which was also filed on Feb. 4, 1999.

FIELD OF THE INVENTION

The present invention relates generally to lasers, detectors, and filters based on chiral structures, and more particularly to lasers, filters, and detectors utilizing multiple cholesteric liquid crystal elements having defects resulting in photonic band gap localized states, the defects being caused by twisting of one chiral structure relative to the other.

BACKGROUND OF THE INVENTION

Semiconductor lasers have found many industrial and commercial applications in recent years. For example, lasers are used in telecommunications, in optically readable media pickups that are used in CD players, CD ROM drives and DVD players, in medical imaging, and in video displays. However, previously known semiconductor lasers have a number of disadvantages. For example, traditional semiconductor lasers, such as ones used in CD players, emit light from the edge of a chip, so it is necessary to cleave a wafer into chips and package the chip before knowing if the laser functions properly. Other types of light sources, such as LEDs do not provide the performance needed for certain applications.

Vertical Cavity Surface Emitted Lasers (hereinafter "VCSELs") have been developed to address the need for a more advanced, higher quality laser that can function well in a variety of applications. VCSELs combine the performance advantages of LEDs and of edge-emitting lasers at costs comparable to LED solutions. VCSELs emit light vertically from the wafer surface, like LEDs, which means their fabrication and testing is fully compatible with standard I.C.s procedures and equipment, and also means that arrays of VCSELs are feasible. Additionally, VCSELs are much faster, more efficient, and produce a smaller divergence beam than LEDs.

The VCSEL structure leads to a host of performance advantages over conventional semiconductor lasers.

1) small size
2) low power consumption
3) 2-dimensional array capabilities

In contrast to conventional edge-emitting semiconductor lasers, the surface-emitting VCSEL has a ly symmetric Gaussian near-field, greatly simplifying coupling to optical elements or fibers. In addition, VCSEL technology allows the fabrication of two-dimensional laser arrays.

However, VCSELs suffer from a number of disadvantages. The manufacture of VCSELs requires sophisticated and expensive microfabrication. Since single-pass gain in thin layer semiconductor lasers is low, VCSELs incorporate highly reflective dielectric stacks which are integrated into the laser as Bragg reflectors. These consist of alternating layers of dielectric material, which are grown using methods of molecular beam epitaxy (MBE). This ensures a close match of the atomic lattice structures of adjacent layers. Alternating atomically ordered layers of materials with different electronic characteristics are thereby produced. The interfaces between the layers must be digitally graded and doped to reduce the electrical resistance.

Much work has been done to improve the performance of VCSELs by increasing the number of layers and/or the dielectric difference between alternating layers. However, this approach makes the fabrication more expensive and difficult. There is also a limit to the number of layers determined by the absorption in these layers. While VCSELs can be manufactured in two-dimensional arrays, there has been great difficulty in achieving uniform structure over large areas and in producing large area arrays. The materials typically used for VCSELs do not have the desired low absorption and high index contrast over a broad frequency range. In particular, it is difficult to achieve high reflectivity in the communication band around 1.5 microns.

In addition, VCSELs cannot be tuned in frequency since their periods cannot be changed. The density of photon modes is not changed appreciably by use of low index contrast multilayer Bragg reflector and the gain cannot be improved in a VCSEL system as compared to that in an ordinary laser cavity. Also, an external device must be used to control the polarization of the light.

Other devices in common use in high tech industries include EM filters for blocking selected light frequencies or for blocking all frequencies except a very small group of frequencies in a narrow range. Such filters are particularly useful in telecommunication applications, such as in digital switches. Other commonly used EM devices include narrow EM detectors for detecting light at selected wavelengths.

In recent years, chiral materials, such as cholesteric liquid crystals have been used in a variety of lasing, filtering and other similar applications to address common drawbacks of standard semiconductor devices such as VCSELs. For example, a copending commonly assigned U.S. Patent Application "Chiral Laser Apparatus and Method" of Kopp et al. (Ser. No. 09/468,148) discloses a layered chiral structure laser with a defect formed by a light-emitting material layer. While that approach is advantageous to previously known techniques, it maybe difficult to construct a layered structure with a precise light emitting material thickness required to produce a defect (the required thickness must be equal to the wavelength of light in the medium divided by 4). More importantly, the position of the localized state caused by the defect cannot be easily controlled because the thickness of the light-emitting material cannot be changed once the device is manufactured. Similarly, previously known chiral filters only function at predefined frequencies.

It would thus be desirable to provide an apparatus and method for inducing a variable defect into a chiral structure. It would also be desirable to provide a tunable chiral EM filter and method. It would also be desirable to provide a chiral EM detector and method with a tunable detection band. It would further be desirable to provide a tunable chiral laser apparatus and method that has advantageous properties similar but superior to VCSELs and that has none of the VCSELs' disadvantages.

SUMMARY OF THE INVENTION

This invention relates to use of chiral structures having a defect defined therein. In accordance with the present invention, a defect causing a localized state may be induced in a chiral structure composed of multiple chiral elements by twisting one element of the chiral structure with respect to the other elements along a common longitudinal axis such that directors of the element molecular layers that are in contact with one another are disposed at a particular "twist" angle therebetween, the twist angle being greater than the shift angle between directors of consecutive layers.

The chiral twist structure may be advantageously utilized in a variety of applications. In one embodiment of the present invention the chiral twist structure may be used as a EM filter to filter light emitted by an external light source at particular wavelengths and circular polarizations. With the addition of a tuning device, the twist angle of the chiral twist structure may be changed resulting in changing the operational wavelength and wavelengths ranges of the filter— essentially producing an readily tunable EM filter.

In another embodiment of the present invention, the chiral twist structure may be used as an EM detector to detect certain wavelengths of light emitted by an external light source. The EM detector is configured similarly to the EM filter except that a sensing element is positioned at the location of the twist and connected to an external detector device. With the addition of a tuning device, the twist angle of the chiral twist structure may be changed resulting in a change of the operational wavelength the filter and the detector—essentially producing an readily tunable EM filter or detector.

In yet another embodiment of the invention, the chiral structure is configured as a laser and includes a gain producing light-emitting material layer connected to an excitation source which excites the light-emitting layer to produce lasing at a predefined wavelength. With the addition of a tuning device, the twist angle of the chiral twist structure may be changed resulting in changing the operational wavelength and wavelengths ranges of the detector—essentially producing a readily tunable chiral laser. In a variation of the chiral laser embodiment, instead of a separate light-emitting material layer, the chiral elements may be doped with excitable light-emitting materials.

In accordance with the present invention, more than two chiral elements may be utilized to configure a filter, detector or laser capable of simultaneous operation at more than one tunable wavelength or wavelength range. The chiral twist structure may also be arranged in a post configuration having transverse dimensions smaller than its height.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote elements throughout the several views.

DETAILED DESCRIPTION OF PREFERRED EMBODIMENTS

The present invention is described with reference to cholesteric liquid crystal materials by way of example only—it should be understood that the apparatus and method of present invention may be utilized with any chiral material having properties similar to cholesteric liquid crystals, without departing from the spirit of the invention. Furthermore, a variety of active or light-emitting materials are described in connection with the present invention. It should be understood that unless otherwise specified, any electrically or optically excitable material that emits photons may be used as a matter of design choice without departing from the spirit of the invention.

Before describing the present invention in greater detail, it would be helpful to provide definitions of common terms utilized in the dielectric lasing and filtering art. "Chiral" materials are not symmetrical on a molecular level—that is molecules of chiral materials are not identical to their mirror images. Cholesteric materials, such as cholesteric liquid crystals (hereinafter "CLCs"), have multiple molecular layers where molecules in the different layers are oriented on average at a slight angle relative to molecules in other layers. Molecules in consecutive layers are rotated slightly relative to those in the preceding layer. Thus, the average direction of the molecules, known as a "director", rotates helically throughout the cholesteric material. For the purposes of the describing the present invention, the angle between directors of consecutive layers shall be referred to as a "shift angle". A pitch of a cholesteric material is defined as a thickness of the material in which the director rotates a full 360 degrees. Cholesteric structures also have a property called "handedness"—they may be right-handed or left-handed depending on the direction of rotation of the molecules from layer to layer. The handedness of a cholesteric structure determines the circular polarization and amplitude of light passing through the structure.

CLCs have a particular reflection band (hereafter referred to as a "photonic stop band") which is a result of its periodic structure—a range of wavelengths where there is no transmission of light through the structure due to reflection. At the edge of the photonic stop band gap there are a series of narrow photonic states (or modes) at the peak of which transmission of light reaches unity. The spectral width of these states is proportional to the inverse of the dwell time for the photons within the CLC medium. The long dwell time of photons in spectrally narrow states facilitates lasing at the frequency of these modes in activated materials since emitted photons are given greater opportunity to stimulate emission before they emerge from the CLC medium. Since the photon lifetime is longest for the state closest to the photonic stop band edge and falls rapidly with state number from the edge, lasing occurs in the wavelength corresponding to the first state or corresponding to a few states closest to the photonic stop band edge. This is taught by the commonly-assigned "Stop Band Laser" patent application of A. Z. Genack et al. (Ser. No. 09/302,630, filed Apr. 30, 1999) which discloses that in a generally homogeneous CLC structure lasing advantageously occurs at the edges of the photonic stop band due to the higher density of photonic states and correspondingly longer dwell time therein.

When a defect, such as spacing or an additional layer of a foreign substance is introduced into a CLC structure, then an additional localized photonic state or number of photonic states may be introduced into the photonic stop band. Maximum efficiency lasing occurs at the frequency of the localized state. An example of such a localized state in the center of the photonic stop band is shown in a graph of FIG. 9.

In accordance with the present invention, a defect causing a localized state may be induced in a chiral structure composed of multiple chiral elements by twisting one element of the chiral structure with respect to the other elements along a common longitudinal axis such that the directors of the molecular layers of the elements that are in contact with one another are disposed at a particular "twist" angle therebetween, the twist angle being greater than the shift angle.

Figure 1A:
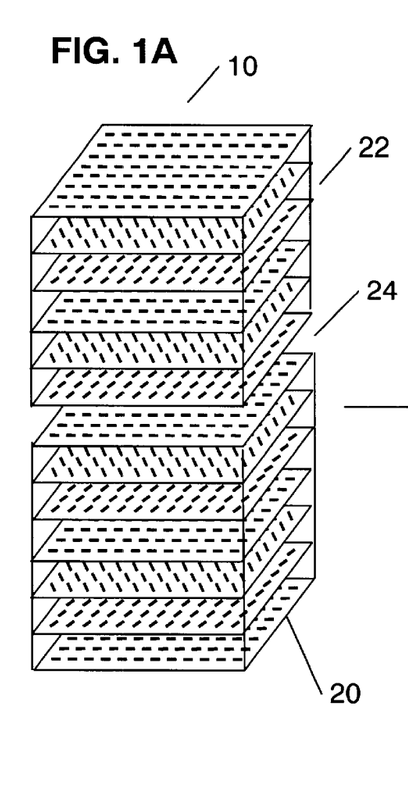
FIG. 1A is a schematic diagram showing molecular layer orientation of two adjacent elements of a prior art chiral structure where the chiral elements have continuous orientation from one element to another.
Figure 9:
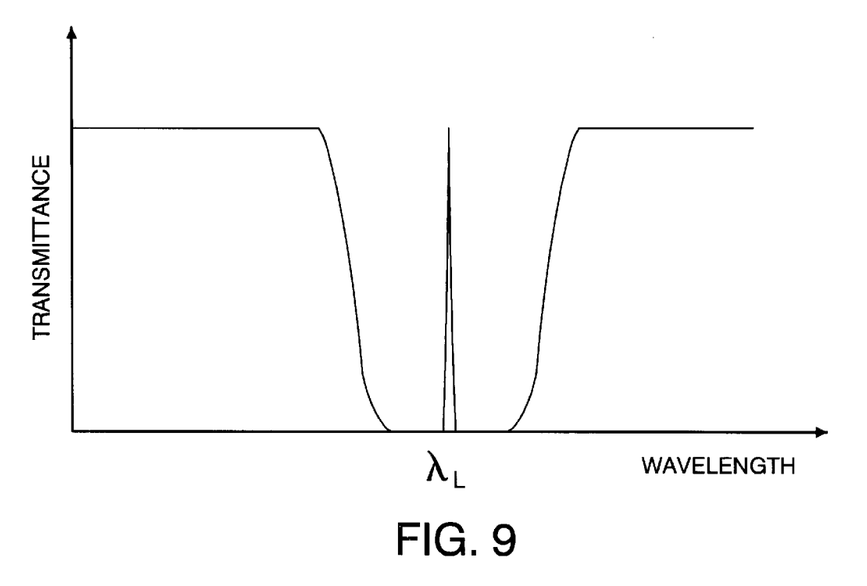
FIG. 9 is a graph diagram of incident light transmittance plotted versus wavelength in connection with a first particular experimental implementation of the embodiments of FIG. 2B to FIG. 6 in accordance with the present invention.

Referring initially to FIG. 1A, a prior art chiral structure 10 is shown having two chiral elements 20 and 22. A plurality of molecular layers is shown in each element 20. 22 with directors of each layer shifting at a predetermined shift angle from layer to layer. In order to produce a localized state in the photonic stop band of the structure 10 (as shown in FIG. 9), a defect such as spacing or a foreign substance would need to be introduced at the area 24. This makes such a structure somewhat difficult to manufacture and makes it impossible to change the nature of the defect—thus the localized state induced by a typical defect and cannot be changed once the structure 10 is formed.

Figure 1B:
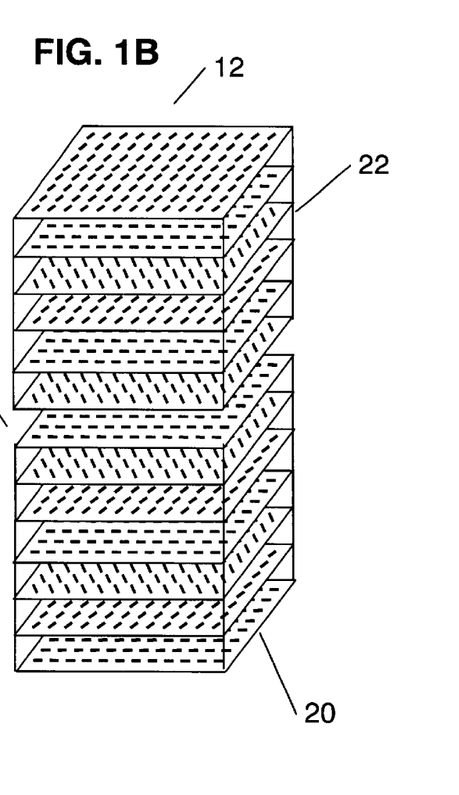
FIG. 1B is a schematic diagram showing the molecular layer orientation of two adjacent elements of an inventive chiral structure where the chiral elements are twisted with respect to one another.

Referring to FIG. 1B, an inventive chiral structure 12 is shown. In order to create a defect in the structure 12, and thus induce the desirable localized state in the photonic stop band, the chiral element 22 is twisted at a 90° angle with respect to the chiral element 20 a position 26. The chiral elements 20, 22 are shown spaced apart from one another to illustrate the change in molecular orientation from chiral element 20 to element 22. In actuality, the chiral elements 20 and 22 are in contact with one another.

Figure 2A:
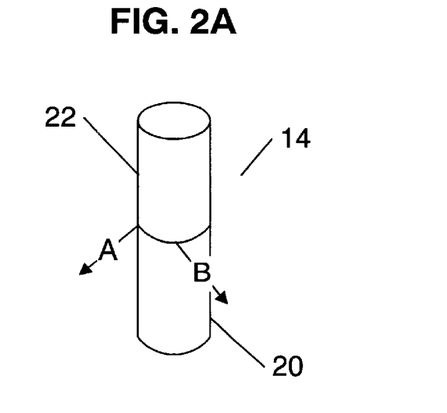
FIG. 2A is a schematic diagram of a post configuration of a chiral structure with two twisted elements of the present invention.
Figure 2B:
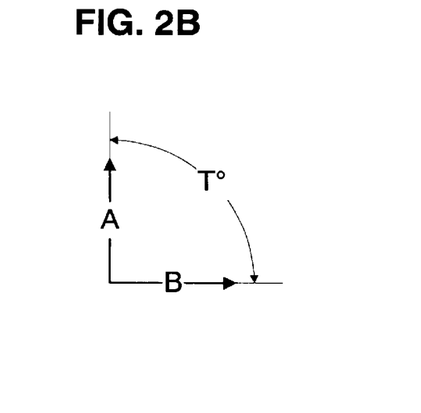
FIG. 2B is a diagram showing a twist angle between the directors of the chiral elements of FIG. 2A.

Referring now to FIG. 2A a chiral structure 14 is shown in a post configuration where the transverse dimensions of the structure 14 are smaller than its height. Chiral structure 14 includes the chiral element 20 with a director A at its contact layer and the chiral element 22 with a director B at its contact surface. Referring to FIG. 2B, a twist angle T is preferably defined between directors A and B of FIG. 2A. Thus, the twist angle T is the angle between the directors of the contact surfaces of two or more chiral elements. Because a shift angle (not shown) already exists between directors of each molecular layer in each chiral element 20, 22, the twist angle T is actually equal to the desired angle between directors A and B plus the shift angle. For example, if the shift angle is 2°, and the desired angle between directors A and B is 90°, then T will be equal to 88°. However, for the sake of simplicity the twist angle T will be referred to as representative of the desired angle between directors—it is presumed that the shift angle is added to angle T. In order to centralize the twist-induced localized state in the photonic stop band, angle T is preferably set to about 90°. If T is set to a smaller value than 90°, the localized state shifts proportionally toward decreasing wavelengths, while if T is set to be higher than 90°, then the localized state shifts proportionally towards increasing wavelengths. The chiral structures 12, 14 of FIGS. 1B and 2A are useful in a variety of applications such as filters, lasers, and detectors. Various embodiments of such applications are shown in FIGS. 3 to 8.

It should be noted that while a defect generated solely by a chiral twist is very effective on its own, in some chiral structures a physical defect may still exist—for example a light emitting material between two chiral elements in a chiral laser. In this case, the chiral twist may be advantageously utilized along with a physical defect, such as spacing. The optimal thickness of the physical defect to produce a localized state in the center of the band gap in the absence of a twist, is the wavelength of light in the chiral medium divided by 4—this is equivalent to a T of 90°. To centralize the localized state in the photonic band gap (and thus to maximize efficiency) the twist angle T may be adjusted such that it supplements the physical defect. For example, if the physical defect has a thickness of a wavelength divided by 8, T must be set to 45° in order to maintain the localized state at its most advantageous central position in the photonic stop gap.

Figure 3:
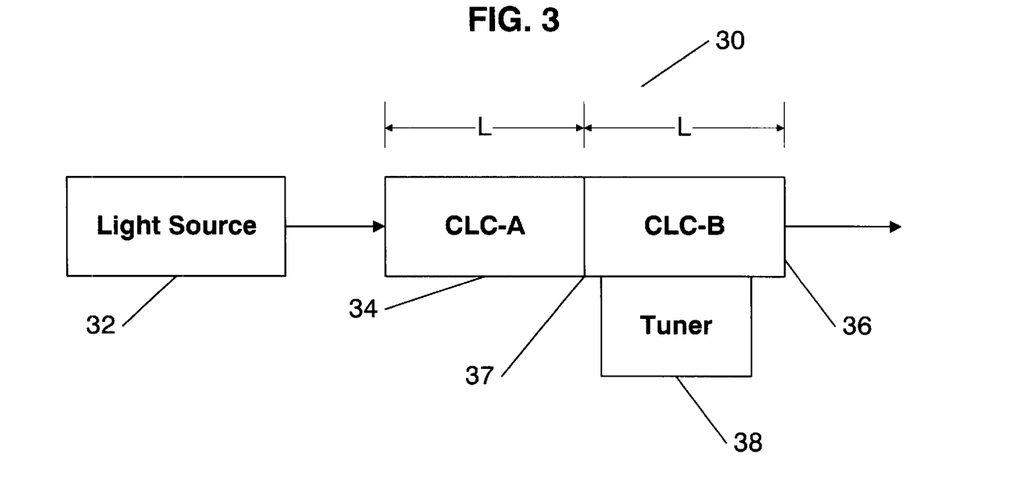
FIG. 3 is a schematic diagram of a first chiral twist filter embodiment of the present invention utilizing two chiral elements.

Referring now to FIG. 3, an EM filter 30 is shown. The filter 30 filters light that is emitted by a polarized light source 32. The polarized light source 32 may be a laser or another source of directed electromagnetic radiation coupled to a polarizer. The filter 30 comprises two chiral elements 34 and 36 which may be cholesteric liquid crystals (CLCs) by way of example, that are twisted along their longitudinal axis with respect to one another such that the directors of contact surfaces of each chiral element 34, 36 at a contact point 37 are at a twist angle T with respect to one another (see FIGS. 2A and 2B).

A length L of each chiral element 34, 36 is of utmost importance in defining characteristics of the filter 30. The functionality of the filter 30 also depends on the polarization direction of light entering the filter 30 from the light source 32 and the handedness of the chiral elements 34, 36 as well as the birefringence value of the elements.

In a first embodiment of the filter 30, when the light source 32 emits right circularly polarized ("RCP") light to the filter 30, and the chiral elements 34, 36 are right-handed structures, the filter 30 will reflect a range of wavelengths of the light passing through except for a very narrow range of wavelengths at the localized state caused by the defect resulting from the twist—assuming that L is less than a predetermined threshold value X. The threshold value X depends on the birefringence characteristic of the chiral elements 34, 36. For example, if birefringence is 0.06, then X is approximately 11–13 microns. Thus, if RCP light enters the filter 30 and L is below X, the filter 30 reflects all wavelengths within the photonic stop band except at the localized state wavelength $8_L$ (see FIG. 9).

Figure 10:
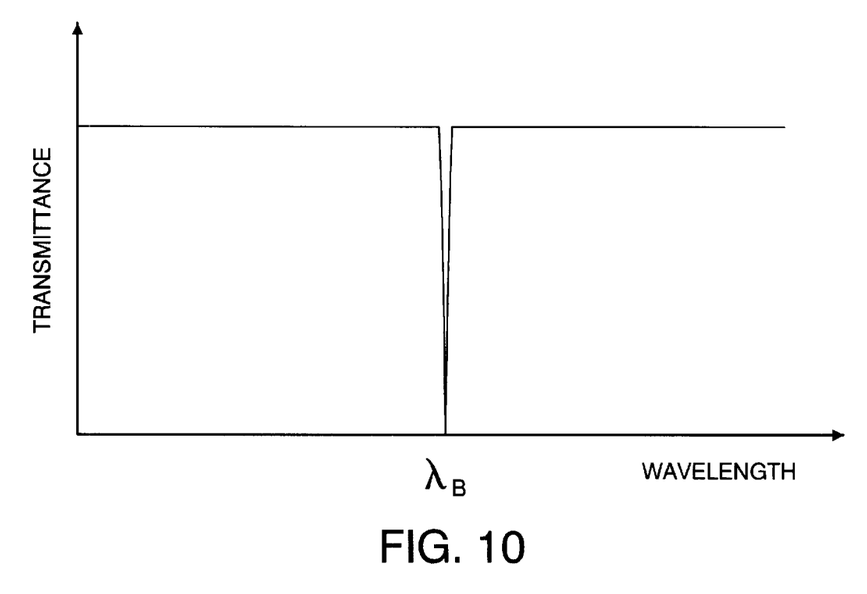
FIG. 10 is a graph diagram of incident light transmittance plotted versus wavelength in connection with a second particular experimental implementation of the embodiments of FIG. 2B to FIG. 6 in accordance with the present invention.

In a second embodiment of the filter 30, when the light source 32 emits left circularly polarized ("LCP") light to the filter 30, and the chiral elements 34, 36 are right-handed structures, the filter 30 will transmit all frequencies of light passing through the chiral elements 34, 36 except for a very narrow range of frequencies at the localized state caused by the defect resulting from the twist that are reflected—assuming that L is greater than the threshold X. Thus, if LCP light enters the filter 30 and L is above X, the filter 30 transmits all wavelengths except for a narrow range of wavelengths at the localized state wavelength $8_B$ (see FIG. 10).

The chiral elements 34, 36 may be fabricated with a predefined twist angle T in which case, the filter 30 would function for particular defined wavelengths of light in both the first and second embodiments. Alternatively, the filter 30 may include an optional tuning device 38 connected to one of the chiral elements 34 or 36 for twisting the chiral element connected thereto with respect to the other chiral element and thus changing the twist angle T. The tuning device 38 may be a mechanical or electronically actuated device adapted for precise rotation of one chiral element with respect to the other chiral element. By causing the tuning device 38 to change the twist angle T, the filter 30 may be tuned to shift the operating wavelengths $8_L$ (of the first embodiment of the filter 30) and $8_B$ of the second embodiment of filter 30. When T is decreased, both wavelengths $8_L$ and $8_B$ are likewise proportionally decreased, and vice versa. For optimal performance of the filter 30, T is preferably set to 90°. It should also be noted that if the chiral elements 34, 36 are left handed structures, then the functionality of the first and second embodiments of the filter 30 are reversed with respect to the direction of polarized light entering the filter 30—the first embodiment functions with LCP light, while the second embodiment functions with RCP light.

Figure 4:
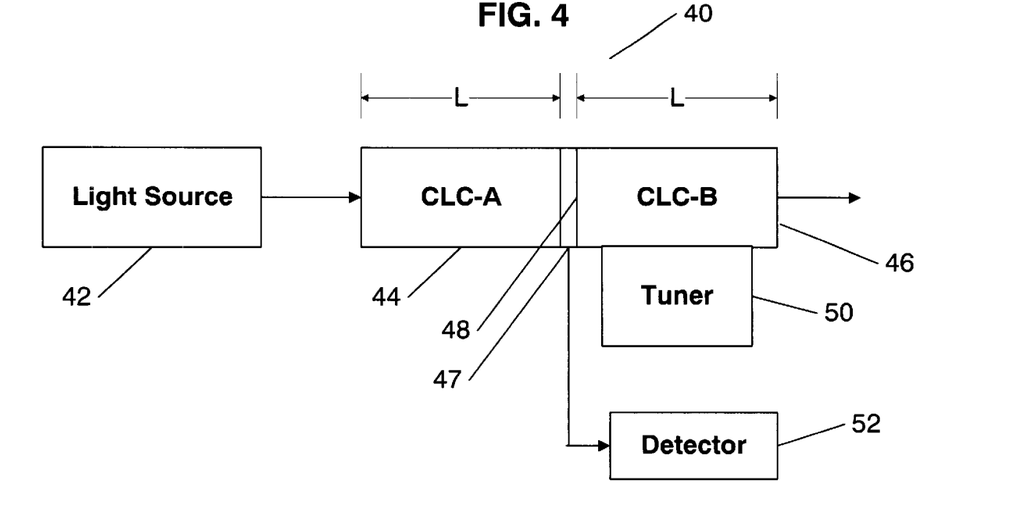
FIG. 4 is a schematic diagram of a chiral twist detector embodiment of the present invention.

Referring now to FIG. 4, an EM detector 40 is shown. The detector 40 detects particular wavelengths of polarized light that are emitted by a light source 42. The light source 42 may be a laser or another source of directed electromagnetic radiation. The detector 40 comprises two chiral elements 44 and 46, which may be cholesteric liquid crystals (CLCs) by way of example, that are twisted along their longitudinal axis with respect to one another such that the directors of contact surfaces of each chiral element 44, 46 at a contact point 47, are at a twist angle T with respect to one another (see FIGS. 2A and 2B). The detector 40 also comprises a sensing element 48 positioned at the contact point 47 which corresponds to the position of the localized state. The sensing element 48, that may be a thin semiconductor layer, converts absorbed photons into electrical energy. Positioning the sensing element 48 at the location where the localized state exits maximizes the sensitivity of the detector 40. The sensing element 48 is connected to a detector 52 for processing the sensed electrical energy and thus sensing light at different wavelengths. For example, the detector 52 may be a current or voltage meter.

Similarly to the filter 30, a length L of each chiral element 44, 46 is of utmost importance in defining the characteristics of the detector 40. The functionality of the detector 40 also depends on the polarization direction of light entering the detector 40 from the light source 42 and the handedness of the chiral elements 44, 46 as well as the birefringence value of the elements.

In a first embodiment of the detector 40, configured to detect RCP light at selected wavelengths, when the light source 42 emits RCP light to the detector 40, and the chiral elements 44, 46 are right-handed structures, the detector 40 will ignore a range of wavelengths of the light passing through except for a very narrow range of wavelengths at the localized state caused by the defect resulting from the twist (and/or sensing element 48 thickness) that will be sensed by the detector 40—assuming that L is less than a predetermined threshold value X. The threshold value X depends on the birefringence characteristic of the chiral elements 44, 46. For example, if birefringence is 0.06, then X is approximately 11–13 microns. Thus, if RCP light enters the detector 40 and L is below X, the detector 40 ignores all wavelengths within the photonic stop band except at the localized state wavelength $8_L$ (see FIG. 9).

In a second embodiment of the detector 30, when the light source 42 emits left circularly polarized ("LCP") light to the detector 40, and the chiral elements 44, 46 are right-handed structures, the detector 40 will detect all frequencies of light passing through the chiral elements 44, 46 except for a very narrow range of frequencies at the localized state caused by the defect resulting from the twist that will be ignored—assuming that L is greater than the threshold X. Thus, if LCP light enters the detector 40 and L is above X, the detector 40 ignores all wavelengths except for a narrow range of wavelengths at the localized state wavelength $8_B$ (see FIG. 10).

The chiral elements 44, 46 may be fabricated with a predefined twist angle T in which case, the detector 40 would function for particular defined wavelengths of light in both the first and second embodiments. Alternatively, the detector 40 may include an optional tuning device 50 connected to one of the chiral elements 44 or 46 for twisting the chiral element connected thereto with respect to the other chiral element and thus changing the twist angle T. The tuning device 50 may be a mechanical or electronically actuated device adapted for precise rotation of one chiral element with respect to the other chiral element. By causing the tuning device 50 to change the twist angle T, the detector 40 may be tuned to shift the operating wavelengths $8_L$ (of the first embodiment of the detector 40) and $8_B$ of the second embodiment of detector 40. When T is decreased, both wavelengths $8_L$ and $8_B$ are likewise proportionally decreased, and vice versa. For optimal performance of the detector 40, T is preferably set to 90° . It should also be noted that if the chiral elements 44, 46 are left handed structures, then the functionality of the first and second embodiments of the detector 40 are reversed with respect to the direction of polarized light entering the detector 40—the first embodiment functions with LCP light, while the second embodiment functions with RCP light.

The chiral detector 40 is particularly advantageous because positioning a commonly known sensing element 48 with an absorption of 0.2% at the location of the twist, sensitivity is increased almost by 200 times because amount of absorbed energy from incident light at the localized defect state is approximately 40%.

Figure 5:
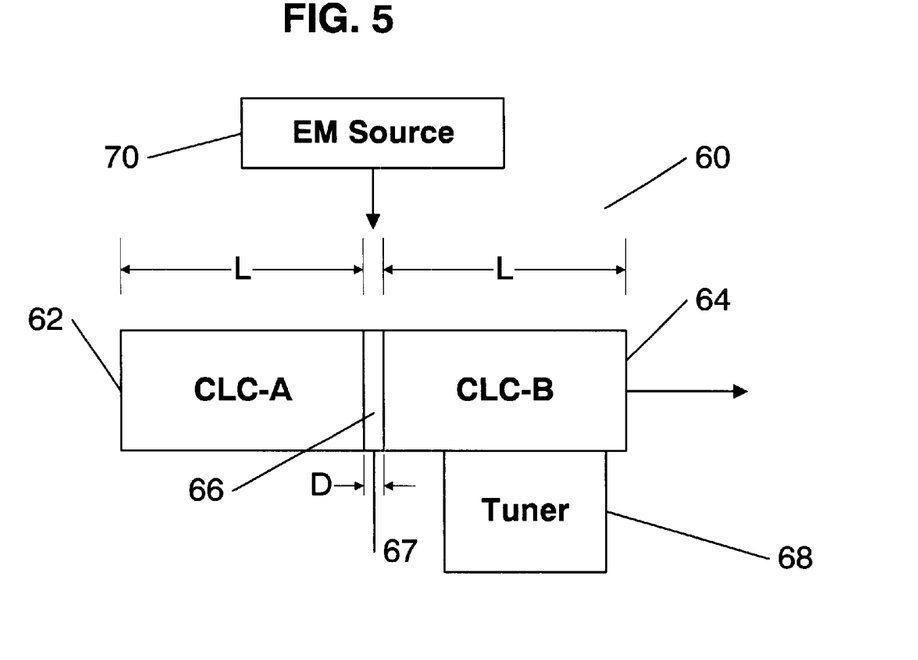
FIG. 5 is a schematic diagram of a first chiral twist laser embodiment of the present invention.

Referring now to FIG. 5, a first embodiment of a chiral twist laser 60 is shown. The chiral twist laser 60 comprises two chiral elements 62 and 64, which may be cholesteric liquid crystals (CLCs) by way of example, that are twisted along their longitudinal axis with respect to one another such that the directors of contact surfaces of each chiral element 62, 64 at a contact point 67, are at a twist angle T with respect to one another (see FIGS. 2A and 2B). The chiral twist laser 60 also comprises an active light-emitting material layer 66 for producing gain, such as a light-emitting diode (e.g. a GaAs diode) positioned at the contact point 67. The light-emitting material 66 may include, but is not limited to: rare earth doped material, chelated rare earth doped material, semiconductor materials, organic light-emitting materials, conjugated polymers, dye-doped material, materials containing color centers, laser dyes, or any medium in which electron-hole recombination occurs in the active material. An EM source 70 excites the light-emitting material 66 to emit light at a certain predefined wavelength. The EM source 70 may be an electron pump for applying voltage to the light-emitting material 66, if the light-emitting material 66 is electrically excitable, or, alternately the EM source 70 may be an optical pump for applying light to the light-emitting material 66 if the light-emitting material 66 is optically excitable.

In either case, excitation of the light-emitting material 66 by the EM source 70, results in emission of electromagnetic radiation that, through stimulated emission, causes polarized lasing at a predefined lasing wavelength. The light-emitting material 66 has a thickness D. As was previously explained, if the thickness D exceeds a certain value, the light-emitting material 66 may itself function as a physical defect resulting in a localized state. In this case the twist angle T between chiral elements 62, 64 must be adjusted to maintain the localized state at its optimal position. Thus, for example if D is equal to wavelength within the medium divided by 8, then T should be set to approximately 45°.

A length L of each chiral element 62, 64 is of utmost importance in defining characteristics of the chiral twist laser 60. The functionality of the chiral twist laser 60 also depends on the handedness of the chiral elements 62, 64 as well as the birefringence value of the elements 62, 64.

In a primary embodiment of the chiral twist laser 60, configured to provide RCP lasing at a selected lasing wavelength, when the light-emitting material 66 is excited by the EM source 70, and the chiral elements 62, 64 are right-handed structures, the chiral twist laser 60 will operate in different modes depending on the magnitude of L:

1) When L is less than a predetermined threshold value X, the chiral twist laser 60 emits RCP lasing;
2) When L is approximately equal to the predetermined threshold value X, the chiral twist laser 60 emits normally polarized lasing; and
3) When L is greater than the predetermined threshold value X, the chiral twist laser 60 emits LCP lasing.

The threshold value X depends on the birefringence characteristic of the chiral elements 62, 64. For example, if birefringence is 0.06, then X is approximately 11–13 microns. Thus the chiral twist laser 60 would function as follows for different values of L:

1) When L is less than approximately 10 microns, the chiral twist laser 60 emits RCP lasing;
2) When L is between about 10 microns to about 12 microns, the chiral twist laser 60 emits normally polarized lasing; and
3) When L is greater than the approximately 12 microns, the chiral twist laser 60 emits LCP lasing.

The length L also influences the width of the localized state caused by the twist defect and thus directly affects the lasing threshold of the chiral twist laser 60. The higher the L, the narrower the localized state width and thus the lower the lasing threshold. However, increasing L result sin diminishing returns until a saturation point is reached at a saturation value Y of L. For the above example, when the birefringence of the chiral elements 62, 64 is 0.06, the saturation value Y is approximately 15 microns.

The chiral elements 62, 64 may be fabricated with a predefined twist angle T in which case, the chiral twist laser 60 would function at a particular defined lasing wavelength. Alternatively, the chiral twist laser 60 may include an optional tuning device 68 connected to one of the chiral elements 62 or 64 for twisting the chiral element connected thereto with respect to the other chiral element and thus changing the twist angle T. The tuning device 68 may be a mechanical or electronically actuated device adapted for precise rotation of one chiral element with respect to the other chiral element. By causing the tuning device 68 to change the twist angle T, the chiral twist laser 60 may be tuned to shift the lasing wavelength $8_L$, for example to provide different color light. When T is decreased, the lasing wavelength $8_L$ is likewise proportionally decreased, and vice versa. It should also be noted that if the chiral elements 62, 64 are left handed structures, then the direction of emitted lasing is reversed—the chiral twist laser 60 will emit LCP light at an L lower than X, and RCP light at an L higher than X.

Figure 6:
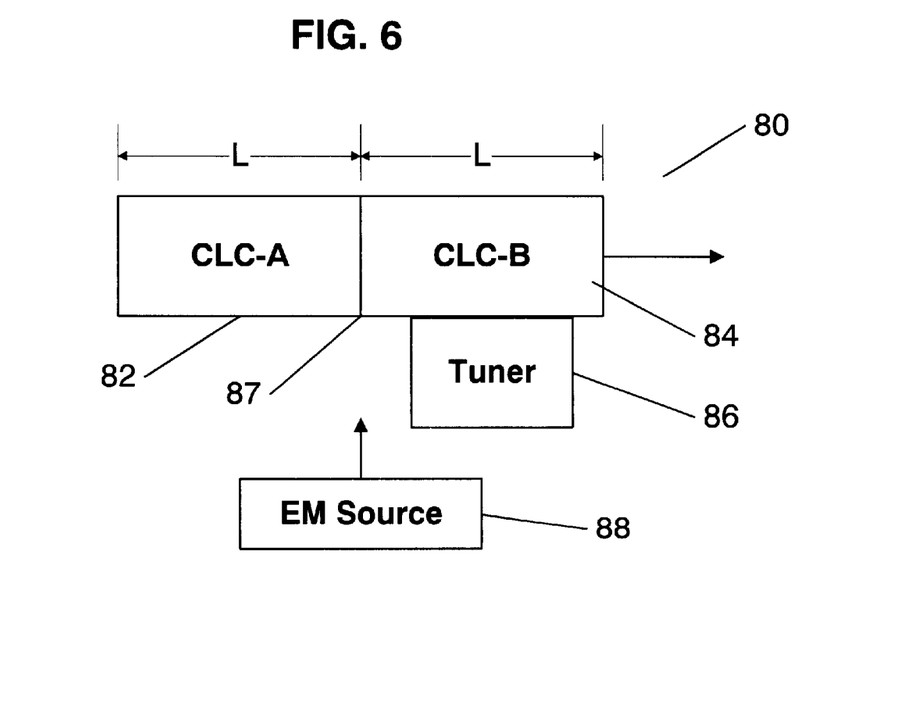
FIG. 6 is a schematic diagram of a second chiral twist laser embodiment of the present invention.

Referring now to FIG. 6, a second embodiment of a chiral twist laser 80 is shown. The chiral twist laser 80 comprises two chiral elements 82 and 84, which may be cholesteric liquid crystals (CLCs) by way of example, that are twisted along their longitudinal axis with respect to one another such that the directors of contact surfaces of each chiral element 82, 84 at a contact point 87, are at a twist angle T with respect to one another (see FIGS. 2A and 2B). Preferably, the chiral elements 82, 84 are doped with a light-emitting electrically or optically excitable material, such as materials utilized in the light-emitting material 66 of FIG. 5. Thus, the chiral twist laser 80 differs from the chiral twist laser 60 in that instead of having a separate gain-producing light-emitting material 66, the gain-producing material is distributed throughout each chiral element 82, 84. The chiral laser 80 other wise operates similarly to the chiral twist laser 60 with respect to the EM source 88, the length L, and the tuner 86.

Previously described embodiments of the present invention of FIGS. 3 to 6 show chiral structures with two chiral elements, it should be noted that more than two consecutive chiral elements may be utilized in a chiral twist structure in accordance with the present invention as a matter of design choice.

Figure 7:
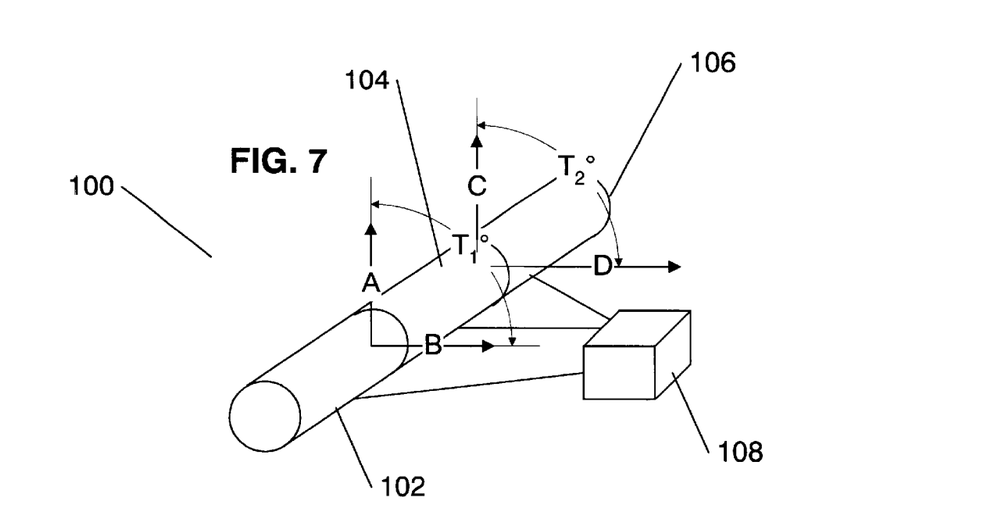
FIG. 7 is a schematic diagram of a second chiral twist filter embodiment of the present invention utilizing more than two chiral elements.

Referring now to FIG. 7, a chiral twist structure 100 is shown that may be utilized as an EM filter or EM detector. The chiral twist structure 100 comprises 3 chiral elements 102, 104, and 106, each element being ly twisted with respect to one another, elements 102 and 104 at a twist angle $T_1$ between their contact surface directors A and B, and elements 104 and 104 at a twist angle $T_2$ between their contact surface directors C and D. The chiral twist structure 100 operates similarly to chiral twist filter 30 or chiral twist detector 40, except that two defects induce two localized states within the photonic stop band, such that the filter 30 or the detector 40 will operate simultaneously at two different wavelengths, each operating wavelength corresponding to each defect at the twist between chiral elements 102 and 104, and elements 104 and 106, respectively. This arrangement is especially advantageous if the twist angles $T_1$ and $T_2$ are tunable by a tuning device 108 because it is possible to construct a filter 30 or detector 40 that operate at two different tunable wavelength ranges.

Figure 8:
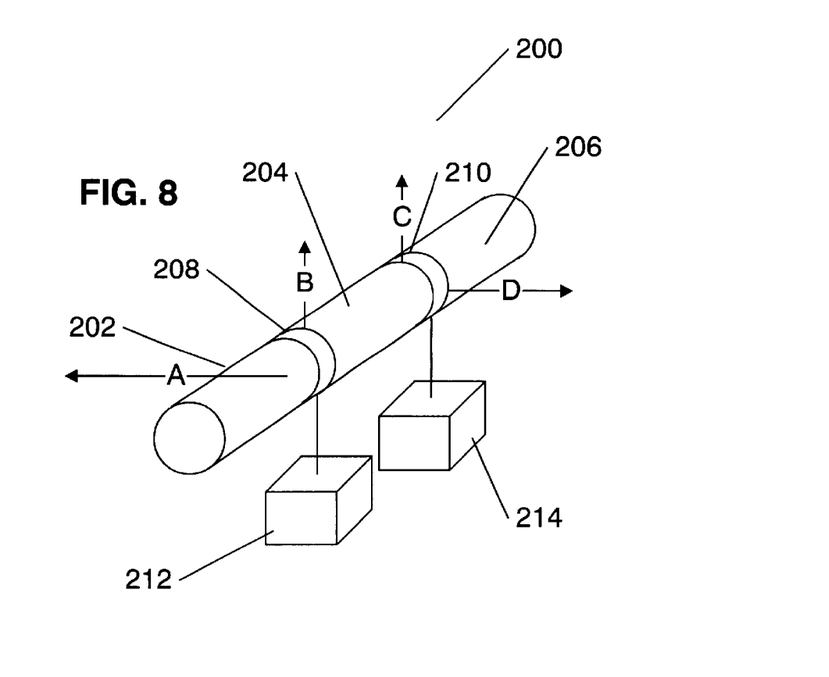
FIG. 8 is a schematic diagram of a third chiral twist laser embodiment of the present invention utilizing more than two chiral elements.

Referring now to FIG. 8, a chiral twist laser 200 with multiple chiral elements is shown. The chiral twist laser 200 comprises 3 chiral elements 202, 204, and 206, each element being ly twisted with respect to one another at twist angles $T_1$ and $T_2$ similarly to chiral twist structure 100 of FIG. 7. Light-emitting materials 208 and 210 are disposed between elements 202 and 204 and elements 204 and 206, respectively. The light emitting materials 208, 210 are substantially identical to the light emitting material 66 of FIG. 5. Excitation sources 212 and 214, may be selectively activated to excite a corresponding respective light-emitting materials 208 or 210 to produce lasing at different wavelengths. This is advantageous because by varying each of the twist angles $T_1$ and $T_2$ the chiral twist laser 200 can be configured to provide lasing at different wavelengths simultaneously.

Thus, while there have shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A chiral structure comprising:
   a first chiral element having a first plurality of molecular layers, each of said first plurality of layers having a unique first director generally representative of an orientation of molecules in said layer each pair of said plural first directors having a shift angle therebetween, and a first contact layer having a first contact director; and
   a second chiral element having a second plurality of molecular layers, each of said second plurality of layers having a unique second director generally representative of an orientation of molecules in said layer, each pair of said plural second directors having a shift angle therebetween, and a second contact layer having a second contact director, wherein said first and second chiral elements are positioned sequentially to one another such that said first contact layer is in substantial contact with said second contact layer, wherein said first and said second chiral elements are twisted with respect to one another about a common axis perpendicular to said first and second plural molecular layers at a twist angle to cause a twist defect within the chiral structure, thereby inducing a localized photonic state in a photonic stop band of the chiral structure at a wavelength proportional to a magnitude of said twist angle.

2. The chiral structure of claim 1, further comprising:
   a tuning device connected to at least one of said first and second chiral elements operable to selectively change said twist angle to alter a position of said induced defect within said photonic stop band.

3. The chiral structure of claim 1, wherein said first and second chiral elements are each of a predefined length and of a predefined transverse dimension, wherein said predefined transverse dimension is substantially smaller than said predefined length.

4. The chiral structure of claim 1, wherein said twist angle is approximately 90 degrees plus said shift angle, such that said localized state is substantially centered in said photonic stop band.

5. The chiral structure of claim 1 configured as a chiral filter for filtering electromagnetic radiation, further comprising:
   an external light source for directing polarized light through said first and said second chiral elements, wherein:
   when said polarized light is of a first polarization direction and said predefined length is substantially below a firs predefined threshold, the chiral filter reflects all wavelengths of said polarized light within its photonic stop band except wavelengths at a localized photonic state induced by said twist defect, said photonic state being centered at said wavelength proportional to said magnitude of said twist angle, and
   when said polarized light is of a second polarization direction and said predefined length is substantially above said first predefined threshold, the chiral filter transmits all wavelengths of said polarized light except wavelengths at said localized photonic state induced by said twist defect that are reflected, said photonic state being centered at said wavelength proportional to said magnitude of said twist angle.

6. The chiral filter of claim 5, further comprising:
   a tuning device, connected to at least one of said first and second chiral elements, operable to tune an operational wavelength of the chiral filter by selectively changing said twist angle to alter a wavelength of said induced twist defect.

7. The chiral filter of claim 5, wherein each of said first and second chiral elements are of a first predefined birefringence value and wherein said first predefined threshold is proportional to said first birefringence value.

8. The chiral filter of claim 7, wherein said first predefined birefringence value is approximately 0.06 and said first predefined threshold is approximately between 11 and 13 microns.

9. The chiral filter of claim 5, each of said first and second chiral elements is a right-handed structure, and wherein said first polarization direction is right circular polarization and said second polarization direction is left circular polarization.

10. The chiral filter of claim 5, wherein each of said first and second chiral elements is a left-handed structure, and wherein said first polarization direction is left circular polarization and said second polarization direction is right circular polarization.

11. The chiral structure of claim 1, wherein said second chiral element comprises a third contact layer having a third contact director, said third contact layer being opposed to said second contact layer of said second chiral element, the chiral structure further comprising:
   a third chiral element having a third plurality of molecular layers, each of said third plural layers having a unique third director generally representative of an orientation of molecules in said layer, each pair of said plural third directors having a shift angle therebetween, and a fourth contact layer having a fourth contact director, wherein said second and third chiral elements are positioned sequentially to one another such that:
   a) said third contact layer is in substantial contact with said fourth contact layer,
   b) said second and said third chiral elements are twisted with respect to one another about a common axis, perpendicular to said first, second, and third plural molecular layers, at a second twist angle, forming a second twist causing a second twist defect within the chiral structure, said second twist defect inducing a second localized photonic state in a photonic stop band of the chiral structure at a second wavelength proportional to a magnitude of said second twist angle.

12. The chiral structure of claim 11 wherein said first and said second twist angles are different.

13. The chiral structure of claim 11, further comprising:
a tuning device connected to at least one of said first, second, and third chiral elements operable to selectively change at least one of said first and said second twist angles to alter at least one of: a first position of said induced twist defect within said photonic stop band, and a second position of said second induced twist defect within said photonic stop band.

14. The chiral structure of claim 11, further comprising:
a first excitable light-emitting element disposed between said first contact layer and said second contact layer;
a second excitable light-emitting element disposed between said third contact layer and said fourth contact layer; and
an excitation means, selectively applied to at least one of said first and second light-emitting elements, for causing said light-emitting elements therein to emit electromagnetic radiation to cause lasing at at least one of said first and said second wavelengths.

15. The chiral structure of claim 1, further comprising:
a physical defect disposed between said first contact layer and said second contact layer, wherein said physical and twist defects together induce a defect localized photonic state in said photonic stop band of the chiral structure at a defect wavelength proportional to said magnitude of said twist angle and to a thickness of said physical defect.

16. The chiral structure of claim 15, wherein said physical defect is selected from a group consisting of: spacing and a foreign material.

17. The chiral structure of claim 1 configured as a chiral detector for sensing electromagnetic radiation, further comprising:
sensing means, disposed between said first and said second contact layers, for converting sensed light into an electrical current indicative of a wavelength of sensed light;
detector means connected to said sensing means for measuring said electrical current; and
an external light source for directing light through said first and said second chiral elements, wherein:
when said light is of a first polarization direction and said predefined length is substantially below a second predefined threshold, the chiral detector only detects wavelengths at a localized photonic state induced by said twist defect, said photonic state being centered at said wavelength proportional to a magnitude of said twist angle, and
when said light is of a second polarization direction and said predefined length is substantially above said second predefined threshold, the chiral detector detects all wavelengths of said light except wavelengths at said localized photonic state induced by said twist defect that are reflected, said photonic state being centered at said wavelength proportional to a magnitude of said twist angle.

18. The chiral detector of claim 17, further comprising:
a tuning device, connected to at least one of said first and second chiral elements, operable to tune an operational wavelength of the chiral detector by selectively changing said twist angle to alter a wavelength at which said induced twist defect is centered.

19. The chiral detector of claim 17, wherein each of said first and second chiral elements are of a second predefined birefringence value and wherein said second predefined threshold is proportional to said second birefringence value.

20. The chiral detector of claim 19, wherein said second predefined birefringence value is approximately 0.06 and said second predefined threshold is approximately between 11 and 13 micron.

21. The chiral detector of claim 17, each of said first and second chiral elements is a right-handed structure, and wherein said first polarization direction is right circular polarization and said second polarization direction is left circular polarization.

22. The chiral detector of claim 17, each of said first and second chiral elements is a left-handed structure, and wherein said first polarization direction is left circular polarization and said second polarization direction is right circular polarization.

23. A chiral laser, comprising:
a first chiral element of a predefined length having a first plurality of molecular layers, each of said first plurality of layers having a unique first director generally representative of an orientation of molecules in said layer, each pair of said plural first directors having a shift angle therebetween, and a first contact layer having a first contact director;
a second chiral element of said predefined length having a second plurality of molecular layers, each of said second plurality of layers having a unique second director generally representative of an orientation of molecules in said layer each pair of said plural second directors having a shift angle therebetween, and a second contact layer having a second contact director,
a excitable light-emitting element disposed between said first contact layer and said second contact layer, said first and second chiral elements being positioned sequentially to one another, such that said first and said second chiral elements are twisted with respect to one another about a common axis perpendicular to said first and second plural molecular layers at a twist angle, said twist causing a defect within the chiral laser, said defect inducing a localized photonic state in a photonic stop band of the chiral structure at a wavelength proportional to a magnitude of said twist angle; and
an excitation means, applied to said light-emitting element, for causing said light-emitting element to emit electromagnetic radiation, wherein:
when said predefined length is substantially below a predefined threshold, substantially right-circularly polarized lasing occurs at a lasing wavelength corresponding to a position of said localized photonic state induced by said defect, said photonic state being centered at a wavelength proportional to a magnitude of said twist angle,
when said predefined length is substantially equal to said predefined threshold, substantially normal polarized lasing occurs at a lasing wavelength corresponding to said position of said localized photonic state induced by said defect, said photonic state being centered at a wavelength proportional to a magnitude of said twist angle, and
when said predefined length is substantially greater than said predefined threshold, substantially left-circularly polarized lasing occurs at a lasing wavelength corresponding to said position of said localized photonic state induced by said defect, said photonic state being centered at a wavelength proportional to a magnitude of said twist angle.

24. The chiral laser of claim 23, further comprising:
tuning means, connected to at least one of said first and second chiral elements, for turning said lasing wavelength of the chiral laser by selectively changing said twist angle to alter said wavelength at which said induced localized state is centered.

25. The chiral laser of claim 23, wherein each of said first and second chiral elements are of a predefined birefringence value and wherein said predefined threshold is proportional to said birefringence value.

26. The chiral laser of claim 23, wherein said predefined birefringence value is approximately 0.06 and said predefined threshold is approximately between 11 and 13 microns.

27. The chiral laser of claim 23, wherein said twist angle is approximately 90 degrees plus said shift angle.

28. The chiral laser of claim 23, wherein said light-emitting element is composed of a material adapted to emit electromagnetic radiation upon application of an electromagnetic wave thereto, and wherein said excitation means comprises an electromagnetic wave source configured to apply said electromagnetic wave to said layered structure to excite said middle light-emitting layer to emit electromagnetic radiation.

29. The chiral laser of claim 23, wherein said electromagnetic wave source is selected from a group consisting of: a laser, a flash lamp, focused sunlight, a light-emitting diode, and an electrically pumped electroluminescent material embedded within said light-emitting element.

30. The chiral laser of claim 23, wherein said light-emitting element is selected from a group consisting of: rare earth doped material, chelated rare earth doped material, semiconductor materials, organic light-emitting materials, conjugated polymers, dye-doped material, and materials containing color centers.

31. A chiral laser, comprising:

a first chiral element of a predefined length having a first plurality of molecular layers, each of said first plurality of layers having a unique first director generally representative of an orientation of molecules in said layer, each pair of said plural first directors having a shift angle therebetween, and a first contact layer having a first contact director;

a second chiral element of said predefined length having a second plurality of molecular layers, each of said second plurality of layers having a unique second director generally representative of an orientation of molecules in said layer, each pair of said plural second directors having a shift angle therebetween, and a second contact layer having a second contact director, wherein said first and second chiral elements are doped with an active excitable light-emitting material and positioned sequentially to one another such that: (a) said first contact layer is in substantial contact with said second contact layer and (b) said first and said second chiral elements are twisted with respect to one another about a common axis perpendicular to said first and second plural molecular layers at a twist angle, said twist causing a defect within the chiral laser; and an excitation means, applied to said first and second chiral elements, for causing said light-emitting materials doped therein to emit electromagnetic radiation, wherein:

when said predefined length is substantially below a predefined threshold, substantially right-circularly polarized lasing occurs at a lasing wavelength corresponding to a position of said localized photonic state induced by said defect, said photonic state being centered at a wavelength proportional to a magnitude of said twist angle, when said predefined length is substantially equal to said predefined threshold, substantially normal polarized lasing occurs at a lasing wavelength corresponding to said position of said localized photonic state induced by said defect, said photonic state being centered at a wavelength proportional to a magnitude of said twist angle, and when said predefined length is substantially greater than said predefined threshold, substantially left-circularly polarized lasing occurs at a lasing wavelength corresponding to said position of said localized photonic state induced by said defect, said photonic state being centered at a wavelength proportional to a magnitude of said twist angle.

32. The chiral laser of claim 31, wherein said light-emitting material is adapted to emit electromagnetic radiation upon application of an electromagnetic wave thereto, and wherein said excitation means comprises an electromagnetic wave source configured to apply said electromagnetic wave to said layered structure to excite said middle light-emitting layer to emit electromagnetic radiation.

33. The chiral laser of claim 31, wherein said electromagnetic wave source is selected from a group consisting of: a laser, a flash lamp, focused sunlight, a light-emitting diode, and an electrically pumped electro-luminescent material embedded within said light-emitting element.

34. The chiral laser of claim 31, wherein said light-emitting material is selected from a group consisting of: rare earth material, chelated rare earth material, semiconductor materials, organic light-emitting materials, conjugated polymers, dye-doped material, and materials containing color centers.

35. A method of generating a defect in an chiral structure comprising the steps of:

(a) providing a first chiral element having a first plurality of molecular layers, each of said first plurality of layers having a unique first director generally representative of an orientation of molecules in said layer, each pair of said plural first directors having a shift angle therebetween, and a first contact layer having a first contact director; and (b) providing a second chiral element having a second plurality of molecular layers, each of said second plurality of layers having a unique second director generally representative of an orientation of molecules in said layer, each pair of said plural second directors having a shift angle therebetween, and a second contact layer having a second contact director, (c) positioning said first and second chiral elements sequentially to one another such that said first contact layer is in substantial contact with said second contact layer; and (d) twisting said first and said second chiral elements with respect to one another about a common axis perpendicular to said first and second plural molecular layers at a twist angle, to cause a twist defect within the chiral structure formed by said first and second chiral elements, thereby inducing a localized photonic state in a photonic stop band of the chiral structure at a wavelength proportional to a magnitude of said twist angle.

36. The method of claim 35, wherein said step (d) further comprises the step of:

(e) selectively changing said twist angle to alter a position of said induced twist defect within said photonic stop band.

37. The method of claim 35, wherein said first and second chiral elements are each of a predefined length and of a predefined transverse dimension, wherein said predefined transverse dimension is substantially smaller than said predefined length.

38. The method of claim 35, wherein said twist angle is approximately 90 degrees plus said shift angle, such that said localized state is substantially centered in said photonic stop band.

39. The method of claim 35, wherein said second chiral element comprises a third contact layer having a third contact director, said third contact layer being opposed to said second contact layer of said second chiral element, the method further comprising the steps of:
   (l) providing a third chiral element having a third plurality of molecular layers, each of said third plurality of layers having a unique third director generally representative of an orientation of molecules in said layer, each pair of said plural third directors having a shift angle therebetween, and a fourth contact layer having a fourth contact director;
   (m) positioning said second and third chiral elements sequentially to one another such that said third contact layer is in substantial contact with said fourth contact layer; and
   (n) twisting said second and said third chiral elements with respect to one another about a common axis, perpendicular to said first, second, and third plural molecular layers, at a second twist angle, to form a second twist to cause a second twist defect and to thereby induce a second localized photonic state in a photonic stop band of the chiral structure at a second wavelength proportional to a magnitude of said second twist angle.

40. The method of claim 39, wherein said first and second twist angles are different.

41. The method of claim 39, further comprising the step of:
   (o) selectively changing at least one of said first and said second twist angles to alter at least one of: a first position of said induced twist defect within said photonic stop band, and a second position of said second induced twist defect within said photonic stop band.

42. The method of claim 39, further comprising the steps of:
   (p) providing a first excitable light-emitting element disposed between said first contact layer and said second contact layer;
   (q) providing a second excitable light-emitting element disposed between said third contact layer and said fourth contact layer; and
   (r) selectively applying excitation to at least one of said first and second light-emitting elements, to cause said light-emitting elements to emit electromagnetic radiation to thereby produce lasing at at least one of said first and said second wavelengths.

43. The method of claim 35 further comprising the steps of:
   (s) introducing a physical defect disposed between said first contact layer and said second contact layer, said physical and twist defects together inducing a defect localized photonic state in a photonic stop band of the chiral structure at a defect wavelength proportional to said magnitude of said twist angle and to a thickness of said physical defect.

44. The method of claim 43, wherein said physical defect is selected from a group consisting of: spacing and a foreign material.

45. The method of claim 35 wherein the chiral structure is configured to filter electromagnetic radiation, further comprising the steps of:
   (f) directing polarized light through said first and said second chiral elements from an external light source;
   (g) when said polarized light is of a first polarization direction and said predefined length is substantially below a first predefined threshold, reflecting all wavelengths of said polarized light within a photonic stop band except wavelengths at a localized photonic state induced by said twist defect, said photonic state being centered at said wavelength proportional to said magnitude of said twist angle; and
   (h) when said polarized light is of a second polarization direction and said predefined length is substantially above said first predefined threshold, transmitting all wavelengths of said polarized light except wavelengths at a localized photonic state induced by said twist defect that are reflected, said photonic state being centered at said wavelength proportional to said magnitude of said twist angle.

46. The method of claim 45, wherein each of said first and second chiral elements are of a first predefined birefringence value and wherein said first predefined threshold is proportional to said first birefringence value.

47. The method of claim 45, wherein said first predefined birefringence value is approximately 0.06 and said first predefined threshold is approximately between 11 and 13 microns.

48. The method of claim 45, wherein each of said first and second chiral elements is a right-handed structure, and wherein said first polarization direction is right circular polarization and said second polarization direction is left circular polarization.

49. The method of claim 45, each of said first and second chiral elements is a left-handed structure, and wherein said first polarization direction is left circular polarization and said second polarization direction is right circular polarization.

50. The method of claim 35 wherein the chiral structure is configured to sense electromagnetic radiation, further comprising the steps of:
   (i) directing light through said first and said second chiral elements from an external light source;
   (j) when said light is of a first polarization direction and said predefined length is substantially below a second predefined threshold, detecting, by a sensing element, only wavelengths at a localized photonic state induced by said twist defect, said photonic state being centered at said wavelength proportional to a magnitude of said twist angle, and
   (k) when said light is of a second polarization direction and said predefined length is substantially above said second predefined threshold, detecting, by said sensing element, all wavelengths of said light except wavelengths at a localized photonic state induced by said twist defect that are reflected, said photonic state being centered at said wavelength proportional to said magnitude of said twist angle.

51. The method of claim 50, wherein each of said first and second chiral elements are of a second predefined birefringence value and wherein said second predefined threshold is proportional to said second birefringence value.

52. The method of claim 50, wherein said second predefined birefringence value is approximately 0.06 and said second predefined threshold is approximately between 11 and 13 microns.

53. The method of claim 50, wherein each of said first and second chiral elements are right-handed structures, and wherein said first polarization direction is right circular polarization and said second polarization direction is left circular polarization.

54. The method of claim 50, wherein each of said first and second chiral elements are left-handed structures, and wherein said first polarization direction is left circular polarization and said second polarization direction is right circular polarization.

55. A method of lasing utilizing a chiral structure, comprising the steps of:

(a) providing a first chiral element of a predefined length having a first plurality of molecular layers, each of said first plurality of layers having a unique first director generally representative of an orientation of molecules in said layer, each pair of said plural first directors having a shift angle therebetween, and a first contact layer having a first contact director;

(b) providing a second chiral element of said predefined length having a second plurality of molecular layers, each of said second plurality of layers having a unique second director generally representative of an orientation of molecules in said layer each pair of said plural second directors having a shift angle therebetween, and a second contact layer having a second contact director, (c) providing a excitable light-emitting element between said first contact layer and said second contact layer, (d) twisting said first and said second chiral elements with respect to one another about a common axis perpendicular to said first and second plural molecular layers at a twist angle, said twist causing a defect within the chiral laser, said defect inducing a localized photonic state in a photonic stop band of within a chiral structure formed by said first and second chiral elements at a wavelength proportional to a magnitude of said twist angle;

(e) applying excitation to said light-emitting element to cause said light-emitting element to emit electromagnetic radiation;

(f) when said predefined length is substantially below a predefined threshold, lasing with substantially right-circularly polarized light at a lasing wavelength corresponding to a position of said localized photonic state induced by said defect, said photonic state being centered at a wavelength proportional to a magnitude of said twist angle;

(g) when said predefined length is substantially equal to said predefined threshold, lasing with substantially normal polarized light at a lasing wavelength corresponding to said position of said localized photonic state induced by said defect, said photonic state being centered at a wavelength proportional to a magnitude of said twist angle; and (h) when said predefined length is substantially greater than said predefined threshold, lasing with substantially left-circularly polarized light at a lasing wavelength corresponding to said position of said localized photonic state induced by said defect, said photonic state being centered at a wavelength proportional to a magnitude of said twist angle.

56. The method of claim 55, wherein said step (d) further comprises the step of:

(i) selectively changing said twist angle to alter a position of said induced defect within said photonic stop band.

57. The method of claim 55, wherein each of said first and second chiral elements are of a predefined birefringence value and wherein said predefined threshold is proportional to said birefringence value.

58. The method of claim 55, wherein said predefined birefringence value is approximately 0.06, and said predefined threshold is approximately between 11 and 13 microns.

59. The method of claim 55, wherein said twist angle is approximately 90 degrees plus said shift angle.

60. A method of lasing utilizing a chiral structure, comprising the steps of:

(a) providing a first chiral element of a predefined length doped with an active excitable light-emitting material and having a first plurality of molecular layers, each of said first plurality of layers having a unique first director generally representative of an orientation of molecules in said layer, each pair of said plural first directors having a shift angle therebetween, and a first contact layer having a first contact director;

(b) providing a second chiral element of said predefined length doped with an active excitable light-emitting material and having a second plurality of molecular layers, each of said second plurality of layers having a unique second director generally representative of an orientation of molecules in said layer each pair of said plural second directors having a shift angle therebetween, and a second contact layer having a second contact director, (c) twisting said first and said second chiral elements with respect to one another about a common axis perpendicular to said first and second plural molecular layers at a twist angle, said twist causing a defect within the chiral laser, said defect inducing a localized photonic state in a photonic stop band of within a chiral structure formed by said first and second chiral elements at a wavelength proportional to a magnitude of said twist angle;

(d) applying excitation to said first and said second chiral elements to cause said light-emitting materials doped therein to emit electromagnetic radiation;

(e) when said predefined length is substantially below a predefined threshold, lasing with substantially right-circularly polarized light at a lasing wavelength corresponding to a position of said localized photonic state induced by said defect, said photonic state being centered at a wavelength proportional to a magnitude of said twist angle;

(f) when said predefined length is substantially equal to said predefined threshold, lasing with substantially normal polarized light at a lasing wavelength corresponding to said position of said localized photonic state induced by said defect, said photonic state being centered at a wavelength proportional to a magnitude of said twist angle; and (g) when said predefined length is substantially greater than said predefined threshold, lasing with substantially left-circularly polarized light at a lasing wavelength corresponding to said position of said localized photonic state induced by said defect, said photonic state being centered at a wavelength proportional to a magnitude of said twist angle.

* * * * *